T. E. MURRAY.
APPARATUS FOR TRAPPING PARTICLES IN SUSPENSION IN GAS CURRENTS.
APPLICATION FILED JAN. 13, 1914.
1,103,995.
Patented July 21, 1914.
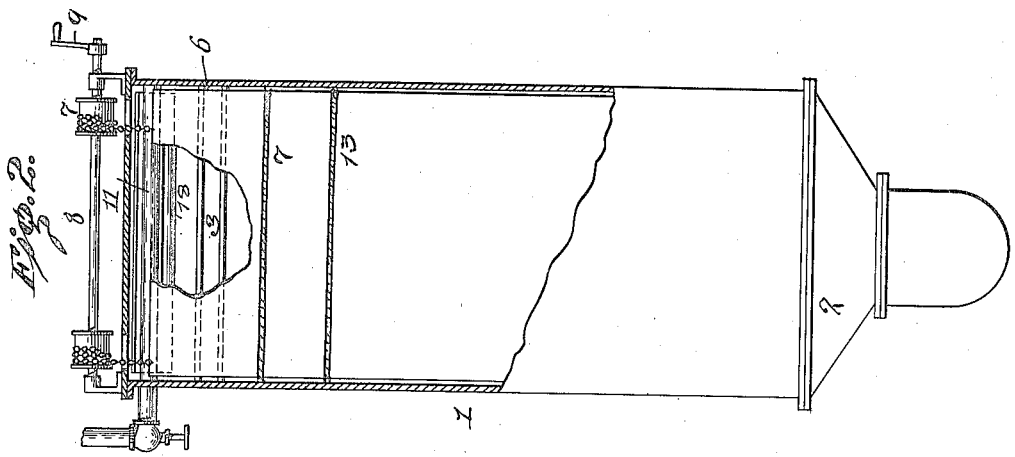
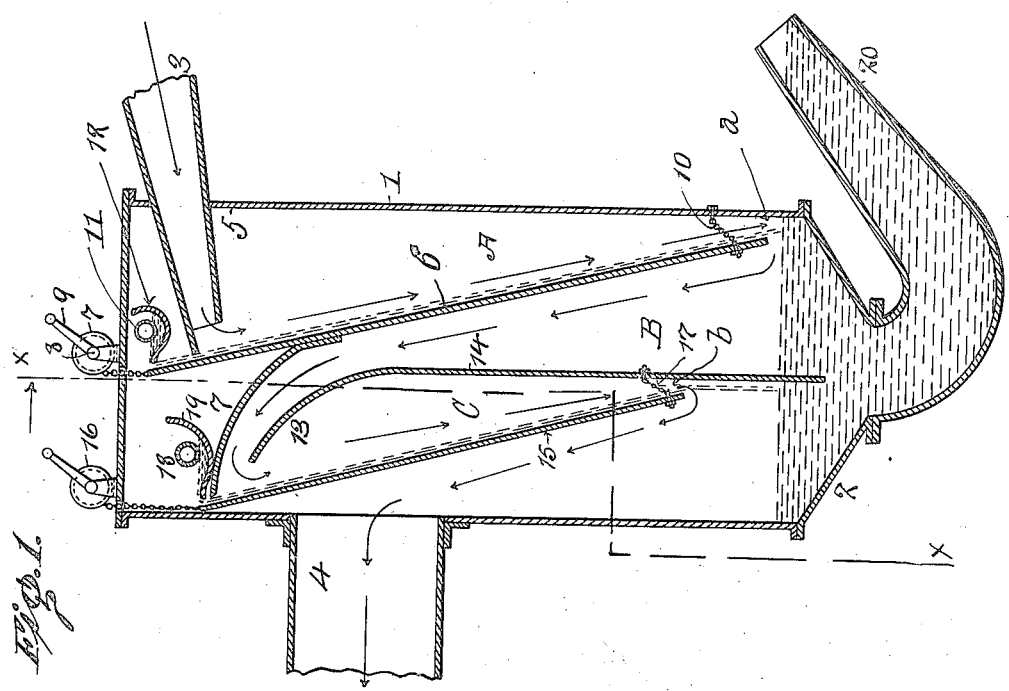

UNITED STATES PATENT OFFICE.

THOMAS E. MURRAY, OF NEW YORK, N. Y.

APPARATUS FOR TRAPPING PARTICLES IN SUSPENSION IN GAS-CURRENTS.

1,103,995.

Specification of Letters Patent. Patented July 21, 1914.

Application filed January 13, 1914. Serial No. 811,822.

*To all whom it may concern:*

Be it known that I, THOMAS E. MURRAY, a citizen of the United States, residing at New York, in the county of New York and State of New York, have invented a certain new and useful Improvement in Apparatus for Trapping Particles in Suspension in Gas-Currents, of which the following is a specification.

The object of the invention is to entrap solid particles entrained with and suspended in a gas current.

In U. S. Patent No. 1,073,621, granted to me September 23, 1913, I have described a construction whereby the cross sectional area of the outlet of a vertical duct, through which said particles are projected upon a body of water, may be varied and whereby the distance of said outlet from said water may be simultaneously altered. In my present device, the gas after undergoing a first purification by projection of the particles upon and into the water below the vertical duct is carried upward and then caused to descend a second and similar duct, from which it is again projected upon the said body of water and subjected to a second purification before being permitted to escape into the atmosphere.

The invention consists in the construction hereinafter set forth, wherein the aforesaid principle is embodied, and whereby the gas current after the first purification and under the conditions resulting therefrom is subjected in the same apparatus to said second purification.

In the accompanying drawings—Figure 1 is a vertical section of my device. Fig. 2 partly in elevation is a section on the line x, x of Fig. 1.

Similar numbers and letters of reference indicate like parts.

1 is a metal casing or shell having its lower portion 2 contracted to form a water receptacle and provided with a central upwardly inclined outlet duct 20 whereby the water is maintained at constant level.

3 is an inlet duct for gas current, derived, for example, from the uptake of a boiler under forced draft. The outlet duct 4 for the purified gas communicates with the atmosphere or smoke stack. The duct 3 enters the shell through wall 5 thereof and has its inner or outlet end in proximity to a partition 6 which is suspended by chains from the drums 7 on top of the shell. Said drums are mounted on the shaft 8 which may be rotated by the crank 9, to raise or lower the partition 6. Within the shell is a fixed partition 7, having an upwardly curved portion and a flat inclined portion, against which inclined portion the suspended partition bears and upon which said suspended partition slides when raised or lowered. The effect of raising partition 6 is to increase the area of outlet *a* at the bottom of the duct A formed between said partition and the wall 5 of the shell; while lowering said partition decreases said area. Near its lower end partition 6 is connected to wall 5 by a chain 10 which limits the maximum area of said outlet. Extending transversely across the inclosed space is a water supply pipe 11 having openings on its under side to permit water flow into a fixed trough 12. The water thus received flows over the edge of said trough and upon partition 6, down which it descends and finally escapes into the bottom receptacle 2.

Below the curved portion of partition 7 is the curved upper portion 13 of a vertical fixed partition 14. The portion 13 is preferably shorter than the curved portion of partition 6. Between partition 6 and partition 14 a duct B is thus formed, through which gas current escaping at the outlet *a* of duct A rises and is delivered upon the upper portion of a partition 15 which is suspended by chains from winding drums 16, similar to winding drums 7. A chain 17 connects said partition 15 to fixed partition 14, and so limits the area of outlet *b* of the duct C formed between partitions 14 and 15, which area is increased as partition 15 is raised, and decreased when said partition is lowered. Extending transversely across the shell is a water pipe 18, which through openings on its under side delivers into a fixed trough 19, from which trough water flows upon the partition 15 and down the same into the receptacle 2. The gas current finally escapes from the shell by outlet duct 4.

The operation is as follows: The gas current entraining particles to be removed is delivered upon partition 6, where it meets the descending water stream from trough 12. Said current then descends the duct A and escapes at the outlet opening a. The solid particles are projected vertically downward upon the water and become in large proportion trapped therein, as already fully explained in my aforesaid patent. The gas passing under the lower edge of partition 6 and through the water stream or screen falling from said edge rises up through the duct B and is delivered upon partition 15. It there meets the water stream descending said partition and goes downwardly through duct C to outlet b. Whatever solid particles may remain in the current are projected, as before, downwardly upon the water in receptacle 2. The gas passes through the streams of water falling from the lower edge of partition 15 and then once more rising leaves the shell by the outlet 4.

By raising or lowering the partitions 6 and 15, I can vary the area of the outlets a and b, and also the distance of said outlets from the surface of the water in receptacle 2, which surface by means of the upwardly inclined escape pipe 20 is kept at constant level, and I can adjust these areas with reference to one another. Thus, the first outlet a, will ordinarily be adjusted with respect to variations in the velocity of the incoming gas current, so that the velocity of the escaping gas particles will be that best suited to insure their trapping by the water in receptacle 2; while the area of the second outlet b will be adjusted to effect the same result with respect to the variations in the velocity of the gas current delivered into duct C. Or, in other words, and generally, the adjustment of the first outlet deals with the velocity conditions of the incoming current, and that of the second outlet deals with the velocity conditions as modified by the first purification. In this way I obtain a more complete removal of the solid particles in the gas current.

I claim:

1. An apparatus for trapping particles in suspension in a gas current, comprising a water receptacle, means for delivering said current a plurality of times successively upon the water surface, and means for independently varying the velocities of the successive current deliveries.

2. An apparatus for trapping particles in suspension in a gas current, comprising a water receptacle, means for projecting said particles downwardly upon the surface of said water to remove a portion of said particles, means for varying the velocity of said projected particles, means for projecting the remaining particles upon said water surface, and means for varying the velocity of said remaining particles.

3. An apparatus for trapping particles in suspension in a gas current, comprising a water receptacle, means for projecting said particles downwardly upon the surface of said water to remove a portion of said particles, means for varying the distance of projection of said particles, means for projecting the remaining particles upon said water surface, and means for varying the distance of projection of said remaining particles.

4. An apparatus for trapping particles in suspension in a gas current, comprising a shell, two substantially vertical ducts therein, each having a discharge outlet at its lower end, a water receptacle in said shell below said outlets and receiving the particles projected therefrom, and a conduit for conveying the gas current escaping from the outlet of the first duct to the inlet of the second duct.

5. An apparatus for trapping particles in suspension in a gas current, comprising a shell, two substantially vertical ducts therein, each having a discharge outlet at its lower end, and a wall movable to vary the cross sectional area of said outlet, a water receptacle in said shell below said outlets and receiving the particles projected therefrom, and a conduit for conveying the gas current escaping from the outlet of the first duct to the inlet of the second duct.

6. An apparatus for trapping particles in suspension in a gas current, comprising a shell, two substantially vertical ducts therein, each having an inclined wall and a discharge outlet at its lower end, a water receptacle in said shell below said outlets and receiving the particles projected therefrom, means for delivering water streams within said ducts and upon said inclined walls, and a conduit for conveying the gas current escaping from the outlet of the first duct to the inlet of the second duct.

7. An apparatus for trapping particles in suspension in a gas current, comprising a shell, two vertical ducts therein, each having a discharge outlet at its lower end and an inclined wall movable to vary the cross sectional area of said outlet, a water receptacle in said shell below said outlets receiving the particles projected therefrom, means for delivering water streams within said ducts and upon said inclined movable walls, and a conduit for conveying the gas current escaping from the outlet of the first duct to the inlet of the second duct.

8. An apparatus for trapping particles in suspension in a gas current, comprising a shell, a water receptacle therein, a fixed vertical partition extending into said water receptacle, an inclined partition forming with the walls of said shell a duct having its outlet over said water receptacle, and an inclined partition forming with the walls of said shell and said fixed partition a second duct having its outlet over said water receptacle, and a third duct formed by the walls of said shell said fixed partition and said first-named inclined partition and conveying gas current from the outlet of said first duct to the inlet of said second duct.

In testimony whereof I have affixed my signature in presence of two witnesses.

THOMAS E. MURRAY.

Witnesses:
GERTRUDE T. PORTER,
MAY T. MCGARRY.